(12) United States Patent
Sutton

(10) Patent No.: US 11,603,911 B2
(45) Date of Patent: Mar. 14, 2023

(54) ROTARY TO LINEAR ACTUATOR

(71) Applicant: Proseal UK Limited, Adlington (GB)

(72) Inventor: Archie W. Sutton, Cheshire (GB)

(73) Assignee: PROSEAL UK LIMITED, Adlington (GB)

( * ) Notice: Subject to any disclaimer, the term of this patent is extended or adjusted under 35 U.S.C. 154(b) by 189 days.

(21) Appl. No.: 17/200,696

(22) Filed: Mar. 12, 2021

(65) Prior Publication Data
US 2022/0290743 A1 Sep. 15, 2022

(51) Int. Cl.
*F16H 19/02* (2006.01)
*B65B 51/14* (2006.01)

(52) U.S. Cl.
CPC .............. *F16H 19/02* (2013.01); *B65B 51/14* (2013.01); *Y10T 74/18056* (2015.01)

(58) Field of Classification Search
CPC .......... F16H 19/02; F16H 19/00; F16H 19/04; B65B 51/14
See application file for complete search history.

(56) References Cited

U.S. PATENT DOCUMENTS

| | | | | |
|---|---|---|---|---|
| 3,986,405 A | * | 10/1976 | Hatch | F16H 19/04 74/29 |
| 4,803,765 A | * | 2/1989 | Ito | B23Q 16/06 29/48.5 R |
| 6,662,517 B1 | | 12/2003 | Suga | |
| 9,765,689 B1 | * | 9/2017 | Amplatz | F01B 9/02 |
| 2017/0037778 A1 | * | 2/2017 | Ganglmayr | F02B 75/045 |
| 2017/0350316 A1 | * | 12/2017 | Hugon | F02B 75/045 |
| 2018/0010672 A1 | * | 1/2018 | Danner | F16H 21/365 |
| 2019/0145507 A1 | * | 5/2019 | Aldadou | F01B 9/047 74/33 |
| 2019/0360560 A1 | * | 11/2019 | Sanders | F16H 19/02 |
| 2021/0108759 A1 | * | 4/2021 | Lyons | A47K 17/022 |
| 2022/0290743 A1 | * | 9/2022 | Sutton | F16H 19/02 |

FOREIGN PATENT DOCUMENTS

| | | |
|---|---|---|
| CH | 290 688 A | 5/1953 |
| CH | 696 038 A5 | 11/2006 |
| DE | 10 2009 044 120 A1 | 3/2011 |
| GB | 165 705 A | 7/1921 |

OTHER PUBLICATIONS

International Search Report and Written Opinion dated Jun. 9, 2022, issued in corresponding Application No. PCT/EP2022/055750, filed Mar. 7, 2022, 15 pages.

* cited by examiner

*Primary Examiner* — David M Fenstermacher
(74) *Attorney, Agent, or Firm* — Christensen O'Connor Johnson Kindness PLLC

(57) ABSTRACT

A rotary to linear actuator, comprises a drive crankarm that rotates in a first axis of rotation; a first and second gearset connected to the drive crankarm through a second crankarm; and a piston captured between the first gearset and the second gear set, wherein the first and second gearsets rotate a crankarm connected to one end of the piston, wherein the piston is caused to move linearly upon rotation of the crankarm.

20 Claims, 8 Drawing Sheets

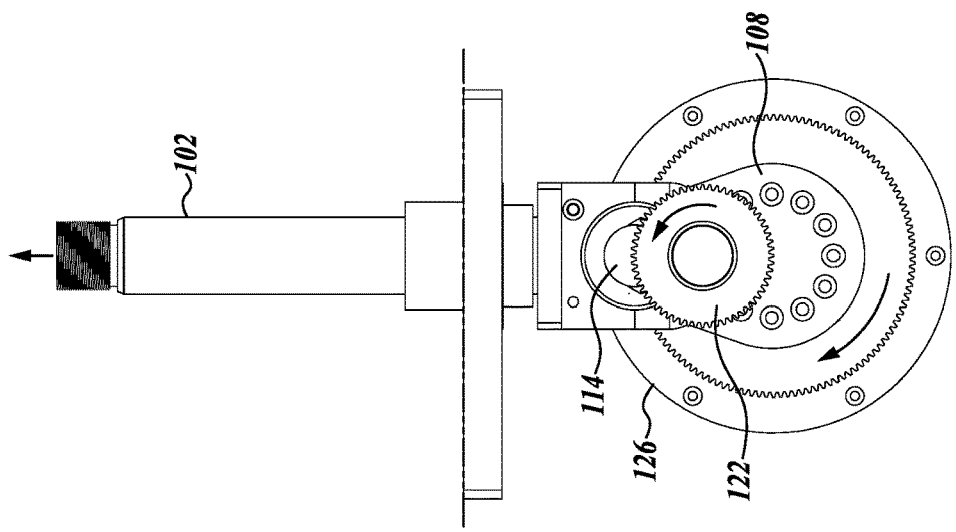
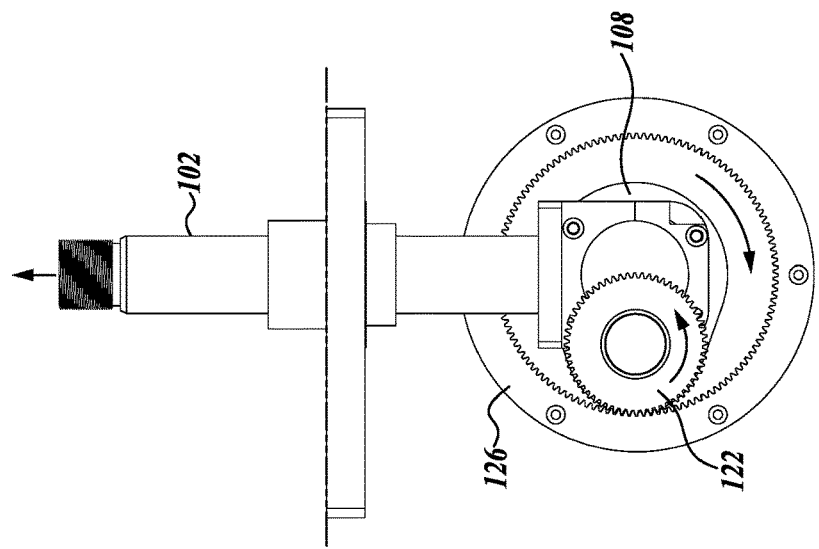
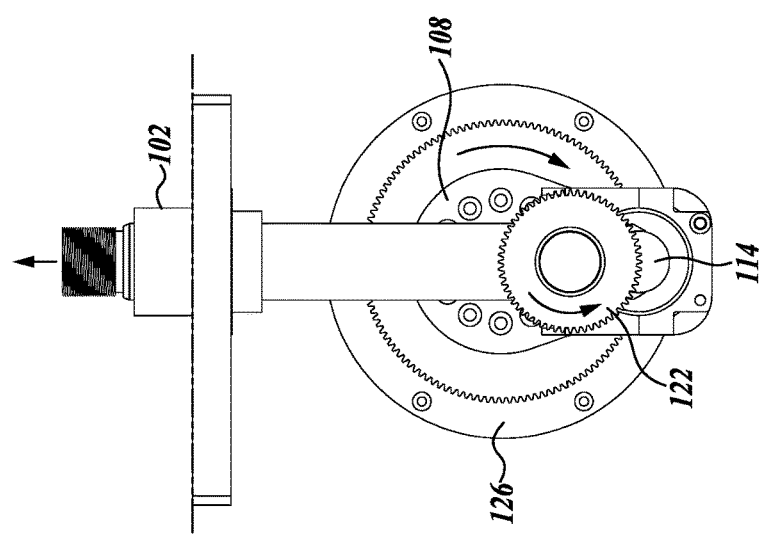

ROTARY TO LINEAR ACTUATOR

BACKGROUND

Machines often require a piston to actuate a machine component in a linear motion. For example, in the food industry, packaging machines often bring together two tools, one being a heating plate, in a linear fashion to heat seal a barrier layer to a tray. The tools need to travel precisely in line so as to avoid defects, and the tools often have to operate continuously for extended periods of time. Accordingly, a piston actuator has to remain accurate, be capable of operating for extended running times, and has to deliver a high compression pressure when necessary. Piston actuators can include pneumatic or hydraulic pistons and ball screw actuators.

However, there is still a need for an alternative piston actuator that can provide true linear motion for extended periods and the aim to reduce motor size.

SUMMARY

An electrical motor drives a reduction gearbox. The output of the reduction gearbox drives the primary crankarm. The primary crankarm moves a rotational axis of the secondary crankarm to follow the arc of an internal ring gear. The engagement of the pinion gears within the ring gears provides the rotary motion of the secondary crankarm. These movements combined provide a reciprocating linear directional movement for the piston axis. Therefore, driving the piston to extend and retract.

This arrangement is supported by a secondary pinion gear and ring gear which provides support and phasing to the primary drive arrangement.

In one embodiment, the rotary to linear actuator is used for the main axis of packaging machinery. The advantage is the utilization of an internal crank mechanism to combine a good general actuation speed, combined with a high-force availability at the end of the actuator stroke.

The rotary to linear piston is an enhancement to this crank mechanism with the aim of extending the service-life and durability.

The rotary to linear piston uses a rotary to true-linear mechanism using pinion gears to convert the rotary motion to linear motion. This very effectively reduces loading and wear on the piston bearings which should extend the life of the actuator. The reduced length footprint of the mechanism also lends itself well to a fully sealed and oil filled unit.

The rotary to linear piston is a fully sealed oil filled compact gearbox converting rotary input to linear motion.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 5A, 5B, and 5C show a sequence of steps for operation of the rotary to linear actuator;

DETAILED DESCRIPTION

Figure 1:
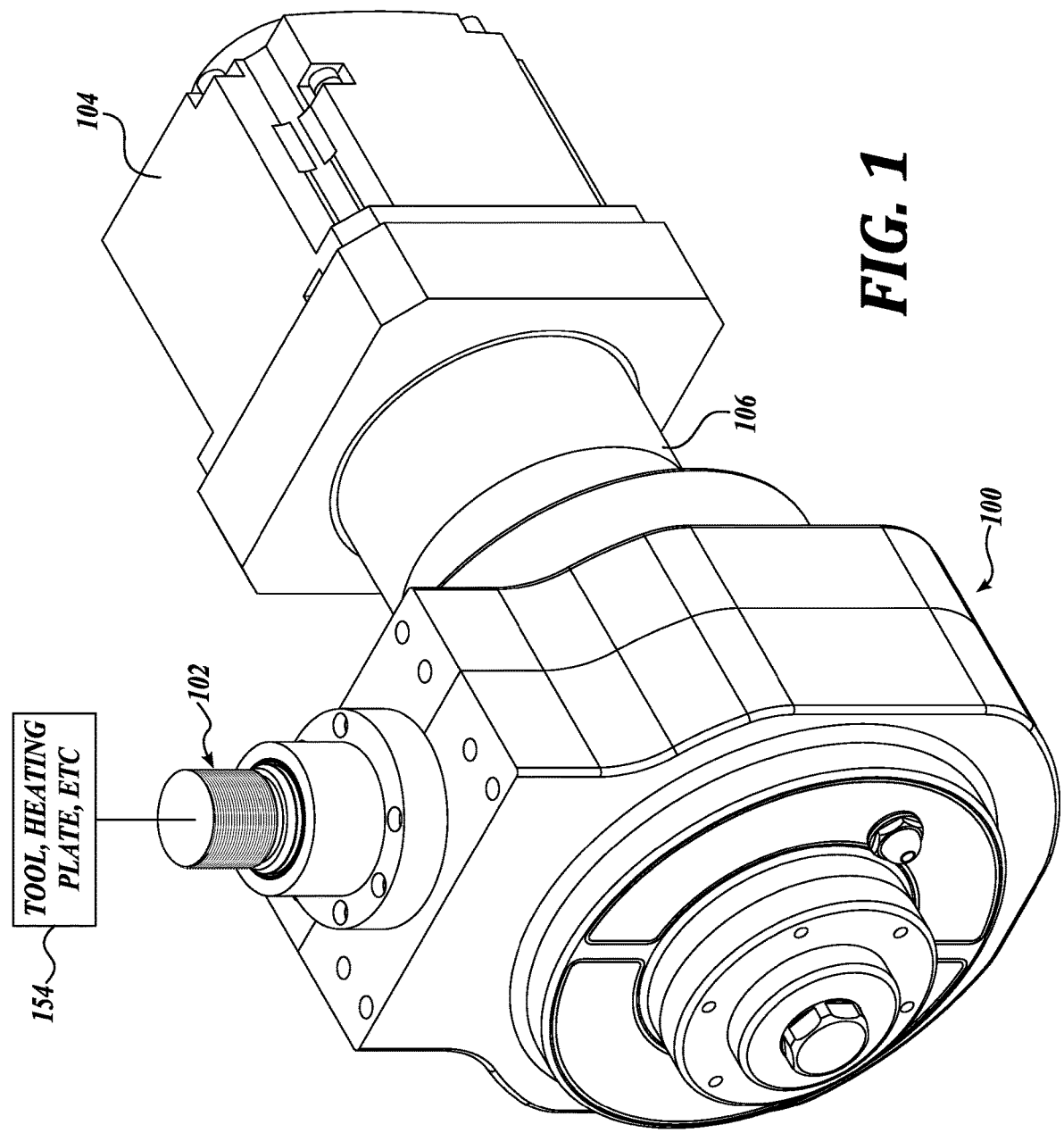
FIG. 1 is a diagrammatical illustration of a rotary to linear actuator connected to a motor and reduction gearbox.

FIG. 1 is an illustration of a rotary to linear actuator 100, a motor 104, and a reduction gearbox 106 to connect the motor to the actuator. The motor can be any AC or DC motor of adequate power for the intended application. In one embodiment, the motor 104 is a servo motor having an encoder that senses both the position and speed of rotation of the motor, thereby enabling the control of the position and speed of the piston. The piston can be connected to any tool 154 that needs to be reciprocated in a linear motion. Although tools and heating plates are listed as representative applications, the actuator 100 can be used in any application requiring linear movement of a tool or part.

Figure 2:
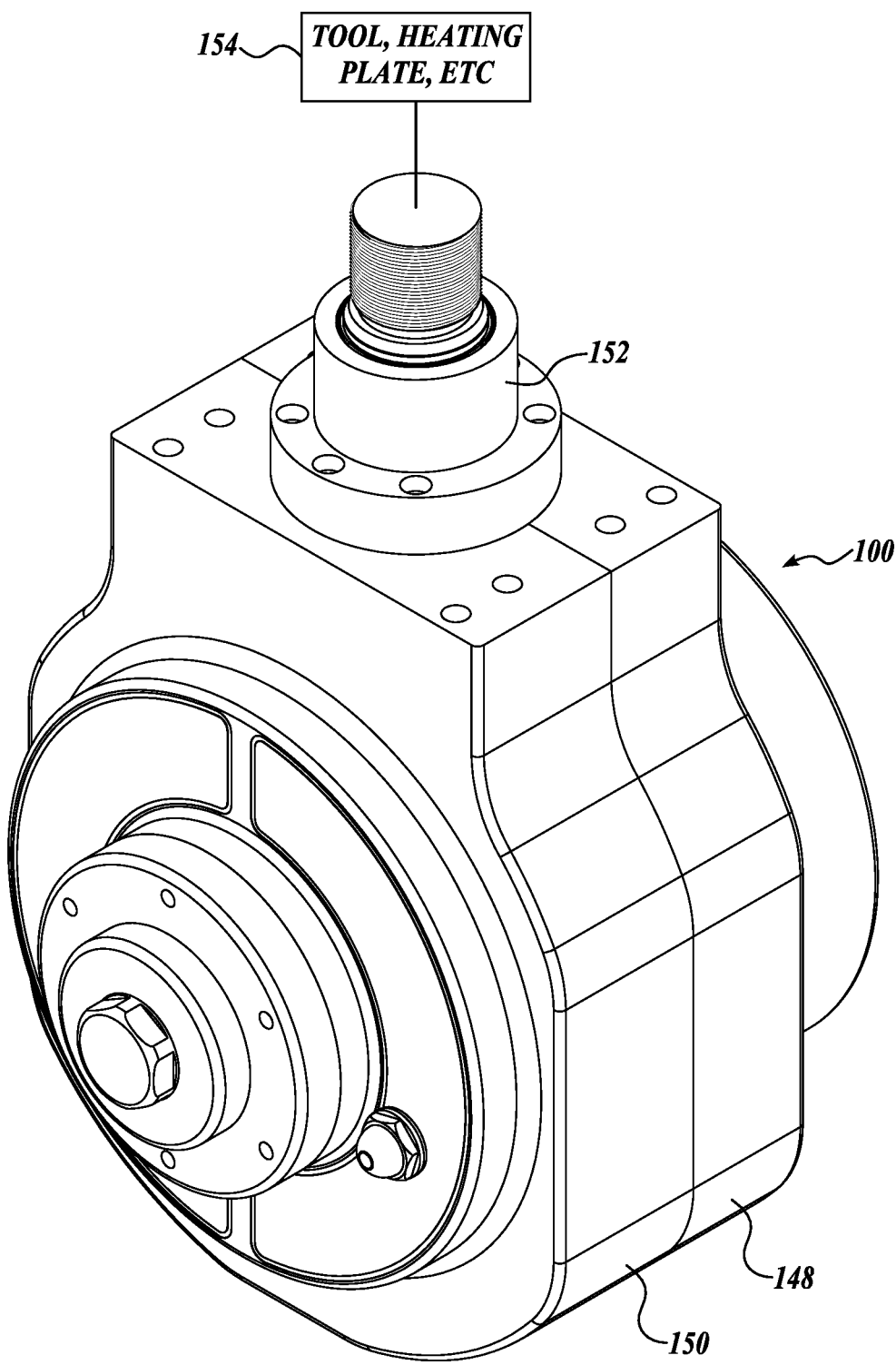
FIG. 2 is a diagrammatical illustration of the rotary to linear actuator of FIG. 1.

FIG. 2 is an illustration of the rotary to linear actuator 100 without the motor 104 and gearbox 106. Although connecting the actuator 100 to the servo motor 104 and gearbox is one application, it is not the only application. The actuator 100 can be connected to any powered driver including, but not limited to motors, gearboxes, belt-drives, and the like.

Figure 3:
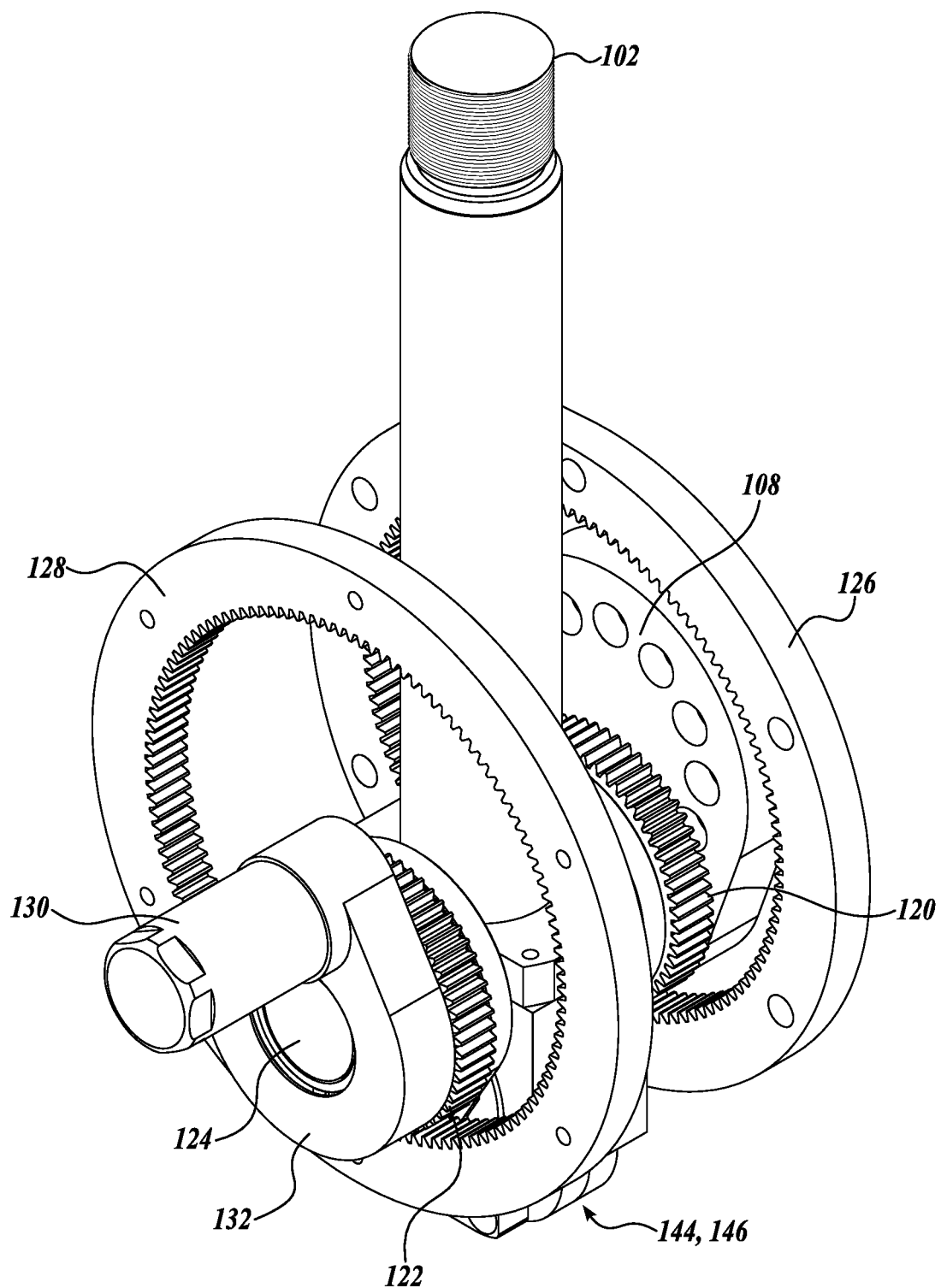
FIG. 3 is a diagrammatical illustration of the internal parts of the rotary to linear actuator of FIG. 1.
Figure 4:
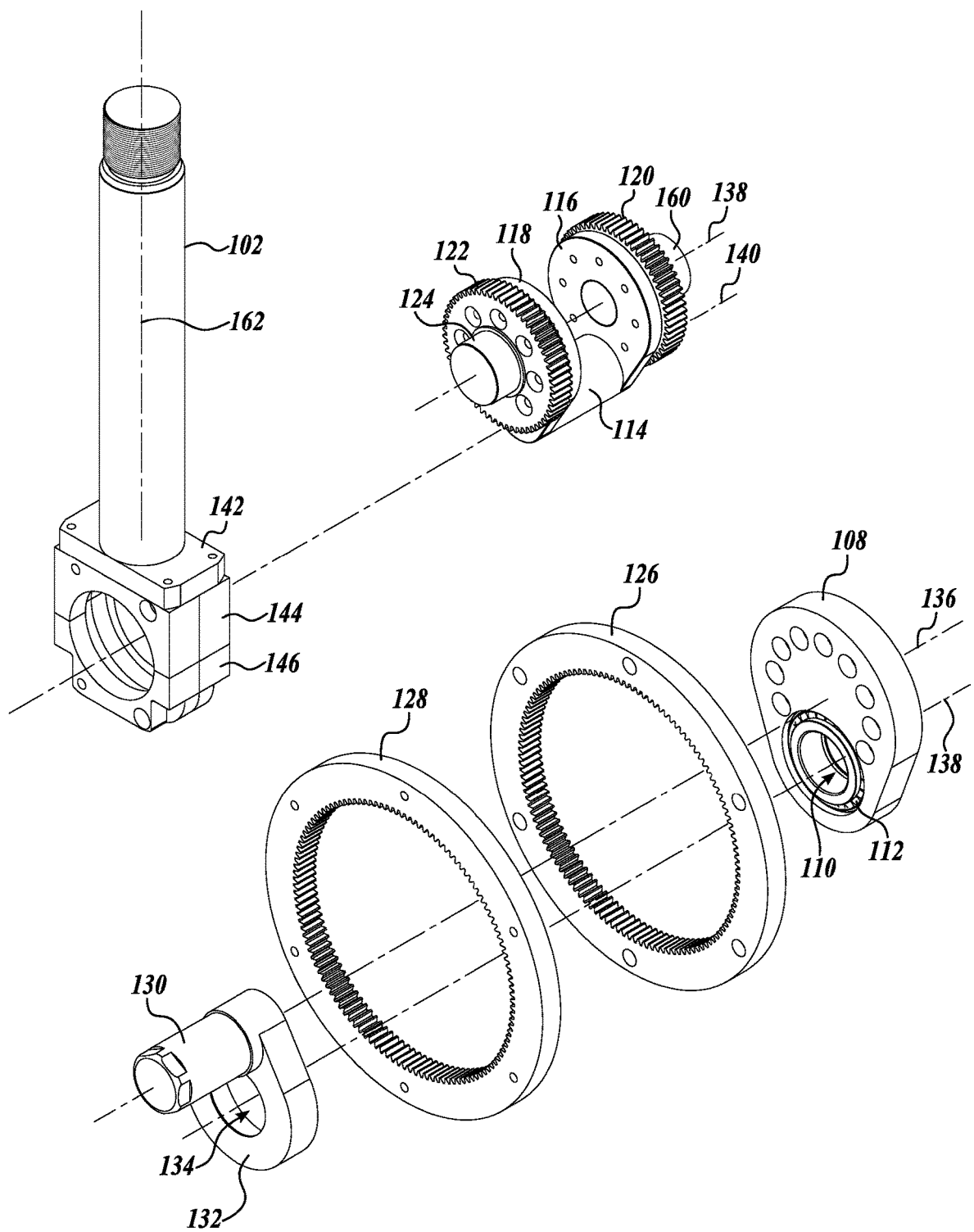
FIG. 4 is a diagrammatical exploded view illustration of the internal parts of the rotary to linear actuator of FIG. 3.

FIGS. 3 and 4 are illustrations of the rotary to linear actuator 100 without the housing 148, 150 to expose the inner parts. In one embodiment, the rotary to linear actuator 100 includes a piston 102 driven by utilizing a first drive crankarm 108 connected to a second 116 and third crankarm 118 through a first gearset 120, 126 and second gearset 122, 128. The crankarm and gearsets provide true linear motion for the piston 102 with lateral stability. In one embodiment, the crankarms and gearsets are installed within the enclosed housing 148, 150 to include filling the housing with oil. Since the piston 102 is caused to travel in a linear motion extending in and out of the housing, the piston 102 can travel within a seal that prevents oil from leaking out of the housing. The drive crankarm 108 is the part that can be connected to any motor directly or indirectly.

A crankarm is a mechanical part that has an axis of rotation so that a second part can be connected to such rotating mechanical part at a radially distant point away from the axis of rotation. The second part usually can also rotate where it is connected to the crankarm. The crankarm length can be considered to be the distance between the two axes of rotation. Although the name "crankarm" suggests a bar or similar object, a crankarm can be circular, oblong or irregular. A crankarm can be included with another mechanical part. For example, in this disclosure, a gear can also include a crankarm, such that the gear can both function as a gear and crankarm.

The drive crankarm 108 is connected to any powered driver, such as motor, gearbox, belt-drive, and the like. In one embodiment, the drive crankarm 108 can be described as a flat flange having two perpendicular sides separated by a constant thickness. In one embodiment, the drive crankarm 108 can have a large circular portion and a smaller circular portion connected by sections forming a tangent between the large and small circular section, thereby resembling a lobe or a "pear." The drive crankarm 108 has the axis of rotation 136 at the center of the larger circular portion.

The smaller circular section or lobe has a bore 110 whose center is radially positioned outward from the axis of rotation 136 at the center of the larger circular section. In one embodiment, the bore 110 can be fitted with a roller or ball bearing 112. Generally, the bearing 112 is designed to withstand radial loads.

The bore 110 receives the stub axle 160 which in turn is connected to the second crankarm 116 and a third crankarm 118. Therefore, the bore 110 is the center of rotation for the second crankarm 116 and the third crankarm 118 which rotate in the second axis of rotation 138. The second crankarm 116 and third crankarm 118 are generally similar in shape to the drive crankarm 108. Both the second and third crankarms 116, 118 can be described as flat flanges having large and small circular portions wherein the center of the larger circular portion is the center of rotation of the crankarms 116, 118. and the smaller circular portion has a center that extends radially outward from the axis of rotation. The smaller circular portions of crankarms 116, 118 are connected through the rod journal 114. The second crankarm 116 and the third crankarm 118 are aligned such that and the arc position (i.e., degrees or arc length) of both second and third crankarms 116, 118 is the same. The rod journal 114 is therefore connected radially away from the second axis of rotation 138. The rod journal 114 then provides the center of rotation for the piston 102, particularly, the lower end of the piston 102, which rotates in the third axis of rotation 140 passing through the axial center of the rod journal 114. The first axis of rotation 136, the second axis of rotation 138, and the third axis of rotation 140 are parallel.

Therefore, the drive crankarm 108 is connected to the piston 102 through a second crankarm 116 and a third crankarm 118. Further, the length of the drive crankarm 108 as measured from the first axis of rotation 136 to the second axis of rotation 138 is equal to the length of the second and third crankarms 116, 118, as measured from the second axis of rotation 138 to the third axis of rotation 140.

In one embodiment, the crankarms 116, 118 and the rod journal 114 are manufactured as one unitary (i.e., single) component part either through welding the parts together or casting or milling a single part before assembling with the piston 102. In the single part configuration, the part gives strength, rigidity, and true alignment for the pinion gears 120 and 122 and helps in keeping the gears synchronized. In the single part configuration, a split bearing or bushing can be used for assembling to the piston 102. However, in one embodiment, the crankarms 116, 118 and rod journal 114 are manufactured separately and can be assembled together with the piston 102 without the need for a split bearing or bushing. For example, by assembling the piston 102 on the rod journal 114 first, and then assembling the first and second crankarms 116, 118 to the rod journal 114, the need for the split bearing is eliminated.

Rotation for the second crankarm 116 and the third crankarm 118 is provided by a first and a second gearset. The first gearset includes the first pinion gear 120 connected and fixed stationary to the second crankarm 116, wherein the first pinion gear 120 rotates in the second axis of rotation 138 together with the second crankarm 116. The first pinion gear 120 intermeshes with the first ring gear 126, wherein the first ring gear 126 is stationary and fixed to the housing. The second gearset includes the second pinion gear 122 connected and fixed stationary to the third crankarm 118, wherein the second pinion gear 122 rotates in the second axis of rotation 138 together with the third crankarm 118. The second pinion gear 122 intermeshes with the second ring gear 128, wherein the second ring gear 128 is stationary and fixed to the housing. In one embodiment, only a single pinion gear 120 and single ring gear 126 is provided in the first gearset, and a single pinion gear 122 and a single ring gear 128 is provided in the second gearset. In the illustrated configuration, the end of the piston 102 is positioned between the first and second pinion gears to provide lateral stability.

The first and second pinion gears 120, 122 can be described as flat spur gears that have straight gear teeth on the outer perimeter. In one embodiment, helical gears can be used. In one embodiment, the first and second pinion gears 120, 122 are similar in pitch circle diameter, number of teeth, and teeth profile and measurements.

The first and second ring gears 126, 128 have gear teeth on the inside perimeter to mesh with the gear teeth on the exterior perimeter of the first and second pinion gears 120, 122. In one embodiment, the first ring gear 126 and the second ring gear 128 can be of similar configuration, pitch circle diameter, number of teeth, and teeth profile and measurements. In any case, the teeth profile and measurements of the first ring gear 126 are configured to mesh with the teeth of the first pinion gear 120, and the teeth profile and measurements of the second ring gear 128 are configured to mesh with the teeth of the second pinion gear. 122 The geometric center of the first and second ring gears 126, 128 is concentric with the first axis of rotation 126 of the drive crankarm 108. Further, the first and second ring gears 126, 128 are stationary and fixed to the housing preventing rotation or any movement of the first and second ring gears 126, 128.

In one embodiment, the second crankarm 116 includes the first stub axle 160 fixed stationary to and positioned in the center and extending axially outward from the second crankarm 116. The first stub axle 160 extends proximally, wherein the first stub axle 160 rotates in the second axis of rotation 138 within a bore 110 of the drive crankarm 108. The stub axle 160 fits in the bearing 112 of the drive crankarm 108, thereby driving the second crankarm 116 and the third crankarm 122. The first pinion gear 120 can be centered in the stub axle 160. The third crankarm 118 includes a second stub axle 124 fixed stationary to and positioned in the center and extending axially outward from the third crankarm 118. The second stub axle 124 extends distally, and the second stub axle rotates in the second axis of rotation 136 within a third stub axle 120. The second pinion gear 122 can be centered in the stub axle 124. However, the manner for fixing the stub axles to the respective pinion gears and crankarms can vary.

The third stub axle 130 is connected eccentrically to a ring 132 having a bore 134 with a bearing to fit on the second stub axle 124 of the third crankarm 118 and second pinion gear 122. The ring 132 is positioned proximally and the stub axle 130 extends distally. The stub axle 130 is positioned in the housing and can protrude out of the housing through a seal and bearing. The stub axle 120 therefore rotates in the first axis of rotation 136, and the ring 132 rotates in the second axis of rotation 128.

In one embodiment, the piston 102 includes a straight cylindrical rod with a base attached to a split roller bearing 144, 146 at one end. In one embodiment, the split roller bearing 144, 146 is used when the rod journal 114 and crankarms 116, 118 are manufactured as a single unit first before assembling to the piston 102. When the rod journal 114 and crankarms 116, 118 are manufactured separately, the piston 102 can be attached to the rod journal 114 without the need for a split bearing.

The opposite end of the piston that extends out of the housing is configured in any manner that can connect the piston 102 to the tool that is to be reciprocated linearly. The split roller bearing 144, 146 at the end of the piston 102 is connected to the rod journal 114 between the second and third crankarms 116, 118 and also between the first and second pinion gears 120, 122 such that the rod journal 114 can rotate in the split roller bearing 144, 146.

From the foregoing description, one embodiment of a rotary to linear actuator 100 can be described as having the features: a drive crankarm 108 that rotates in a first axis of rotation 136; a second crankarm 116 connected to the drive crankarm 108, wherein the second crankarm 116 rotates in a second axis of rotation 138 radially distant from the first axis of rotation; a first pinion gear 120 connected to the second crankarm 116, wherein the first pinion gear rotates in the second axis of rotation, and the first pinion gear is intermeshed with a stationary first ring gear 126; a third crankarm 118 connected to the second crankarm through a rod journal 114 radially distant from the second axis of rotation, wherein the third crankarm rotates in the second axis of rotation, and the rod journal passes through a third axis of rotation 140; a second pinion gear 122 connected to the third crankarm, wherein the second pinion gear rotates in the second axis of rotation, and the second pinion gear is intermeshed with a stationary second ring gear 128; a piston 102 connected to the rod journal, wherein the piston travels in a reciprocating linear motion as the drive crankarm is rotated.

In one embodiment, a rotary to linear actuator 100 can be described as having the features: a drive crankarm 108 that rotates in a first axis of rotation 136 to rotate a second axis of rotation 138; a first 120, 126 and second 122, 128 gearset connected to the drive crankarm through a second crankarm 116, wherein the second crankarm has a center of rotation at the second axis of rotation; a piston 102 captured between the first gearset and the second gearset, wherein the first and second gearsets rotate the second crankarm and a third crankarm 118, the second and third crankarms are connected to one end of the piston, wherein the piston is caused to move linearly upon rotation of the drive crankarm.

The features described or shown in the drawings can also be included to create embodiments of the rotary to linear actuator 100 with additional features.

Figure 6:
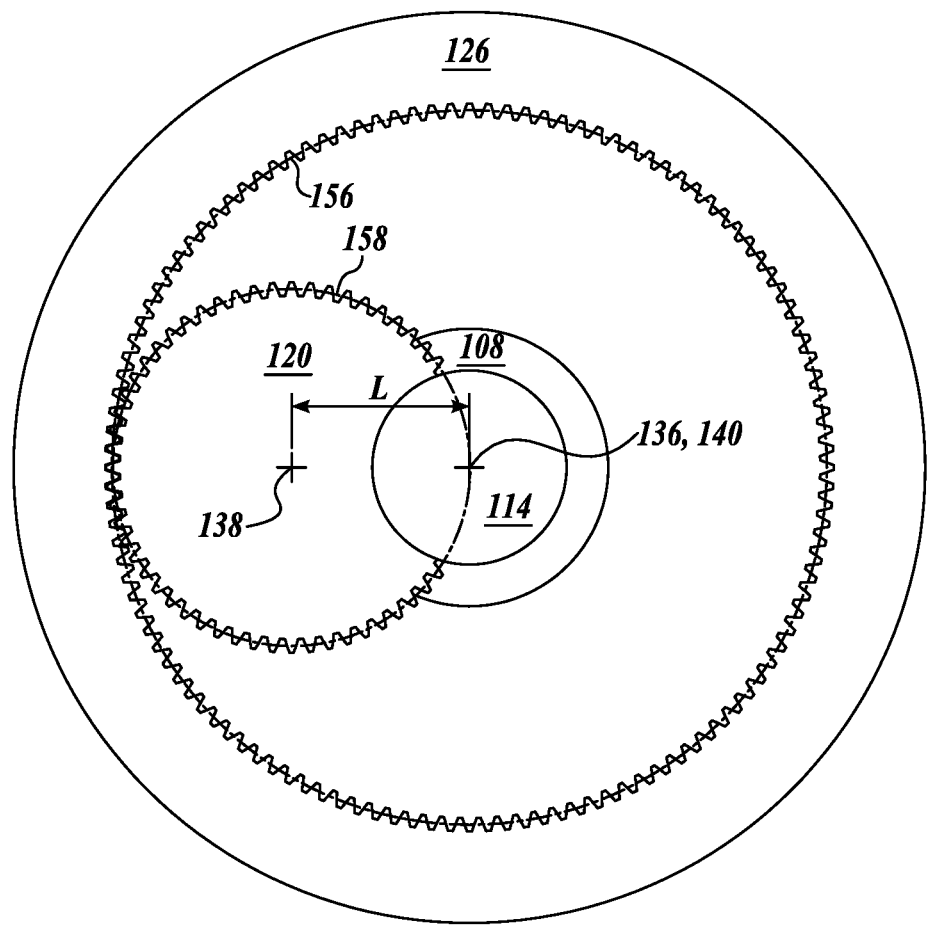
FIG. 6 is a cross section of the rotary to linear actuator showing the relationships of the gears and crankarms.

The embodiments of the rotary to linear actuator 100 provide a true linear piston motion where the axial center 162 of the piston 136 passes as closely as possible through the first axis of rotation 136. Referring to FIG. 6, a relationship that provides the piston 102 to travel in a linear motion is that the distance between the first 136 to the second axis 138 of rotation is the same as a distance between the second 138 to the third axis 140 of rotation. Also, the center to center length of the drive crankarm 108 (crankarm 108 center to pinion gear 120 center) is the same as the center to center length of the second and third crankarms 116, 118 (crankarm 116, 118 center to rod journal 114 center. Further, the number of teeth on the pinion gears 120, 122 is one half the number of teeth of the respective ring gears 126, 128. Stated another way, the circumference of the pitch circle 158 of pinion gears 120, 122 is one half the circumference of the pitch circle 156 of the respective ring gears 126, 128. The pitch circle of a gear is that diameter of a gear that corresponds to a disc without teeth. For example, when two gears mesh with each other, the two gears can be considered to be two smooth discs touching at a tangent. The disc diameter in that circumstance is the pitch circle of the gear.

FIGS. 5A, 5B, and 5C illustrate one operation of the embodiments of the rotary to linear actuator 100. In FIG. 5A, the drive crankarm 108 is at 0 degrees of rotation. In this position, the piston 102 is fully retracted within the housing, and the drive crankarm 108 is aligned with the piston's 102 axial center, and the crankarms 116, 118 are also aligned with the piston's 102 axial center. The pinion gears 120, 122 are assembled in the position illustrated in FIG. 5A to operate as intended.

In FIG. 5B, the servo motor 104 is controlled to rotate the drive crankarm in the clockwise direction causing the pinion gears 120, 122 to rotate in the counterclockwise direction because of the stationary ring gears 126, 128. Because the piston 102 is supported by the upper end of the housing by a sleeve bearing, the piston 102 moves axially upward upon rotation of the pinion gears 126, 128.

In FIG. 5C, the servo motor 104 has rotated the drive crankarm 108 sufficiently to reach top dead center at 180 degrees. The servo motor 104 can be paused at 180 degrees. For example, if the rotary to linear actuator is being used for heat sealing trays, the servo motor 104 may be paused for a sufficient time to allow a hot plate to adequately seal the barrier layer to the top side of a tray.

In one embodiment, after pausing to allow heat sealing, the servo motor 104 is controlled to reverse direction to rotate the drive crankarm 108 in the counterclockwise direction, thereby, the pinion gears 120, 122 rotate in the clockwise direction causing the piston 102 to retract into the housing. Once the piston reaches the home position or 0 degrees as illustrated in FIG. 5A, the servo motor 104 can pause to unload the heat sealed tray and load a new tray. Then, the servo motor 104 continues to rotate the drive crankarm counterclockwise, so as to alternate rotation of the pinion gears 120, 122 from left and right sides of the ring gears 126, 128.

Figure 7:
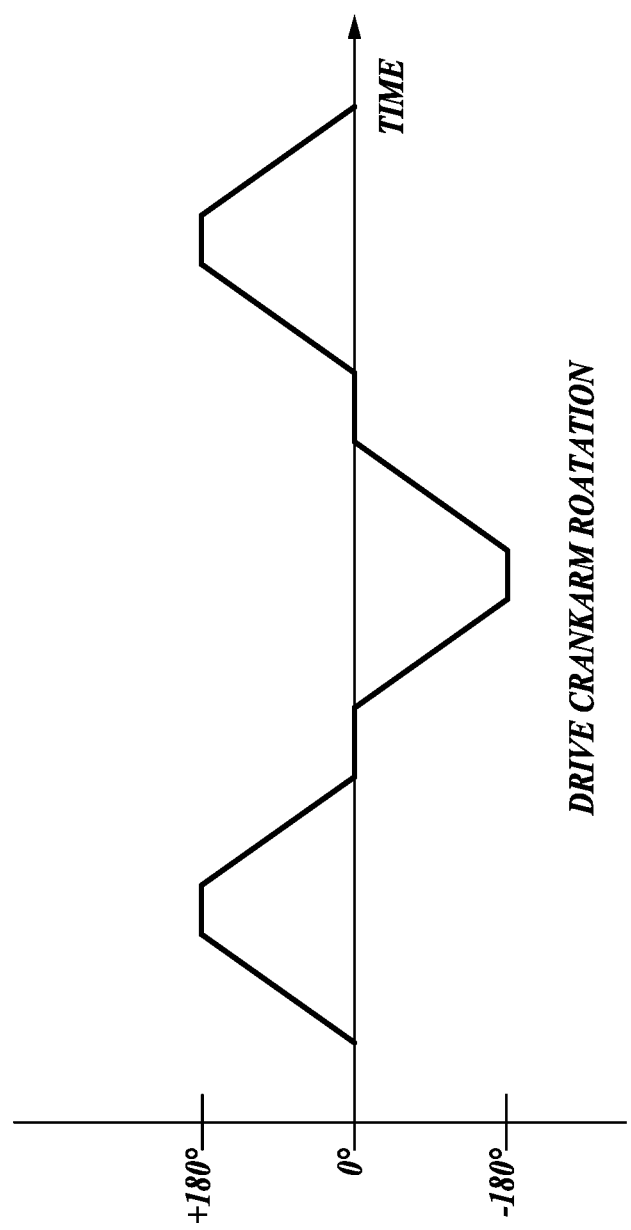
FIG. 7 is a graph showing one embodiment of operation of the rotary to linear actuator.

FIG. 7 illustrates a sequence of steps over time showing the operation. Rotation begins at 0 degrees in one direction. When 180 degrees of rotation is reached, rotation can be paused. Thereafter, the servo motor reverses direction and rotates 180 degrees in the opposite direction. Upon reaching 0 degrees again, rotation is paused. Thereafter, rotation continues in the same direction as immediately prior. When 180 degrees is reached in the opposite direction, rotation is paused. Thereafter, rotation is reversed to return to 0 degrees. The sequence of steps is continually repeated pausing at 180 degrees and 0 degrees with alternating rotation between the first and second directions.

In one embodiment, instead of alternating rotation, a single direction of rotation is selected. For example, the crankarm 108 starts at 0 degrees, wherein at 0 degrees the piston 102 is fully retracted. Then, the crankarm 108 is rotated 180 degrees in a first direction either clockwise or counterclockwise, wherein at 180 degrees the piston 102 is fully extended. Then, the crankarm 102 is paused at 180 degrees. Then, the crankarm 102 is rotated another 180 degrees in the first direction to return to 0 degrees and pauses at 0 degrees completing one cycle. The cycle is repeated pausing at 180 degrees and 0 degrees while rotating in the first direction, which can be either clockwise or counterclockwise.

The servo motor 104 can cycle the piston 102 position from fully retracted to fully extended and back to fully retracted at least 20 cycles per minute. Furthermore, the piston can apply pressure from greater than 0 to 100 tons.

Figure 8:
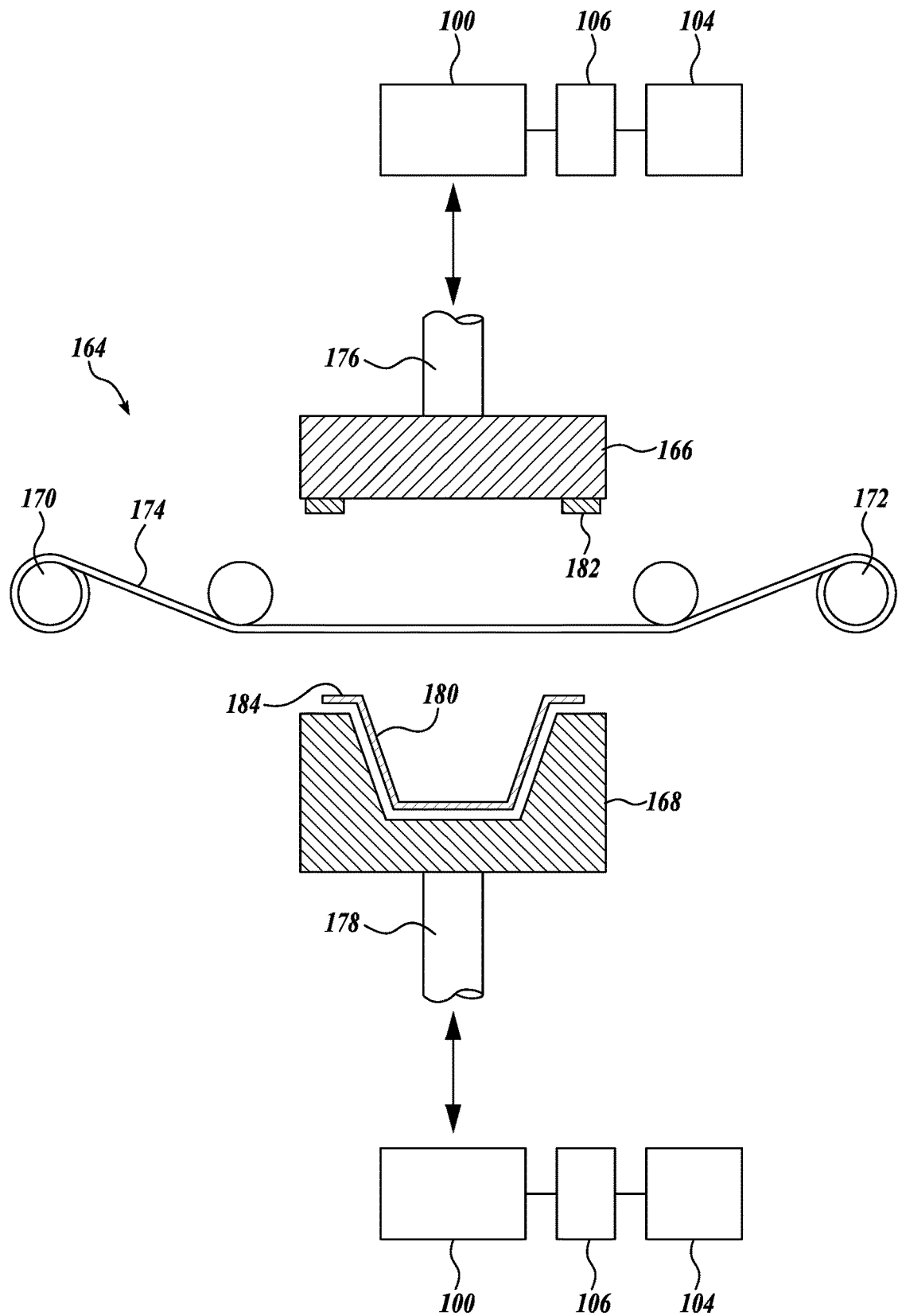
FIG. 8 is a schematic illustration of an application for the rotary to linear actuator.

FIG. 8 is a schematic illustration of the use for any one of the embodiments of the rotary to linear actuator 100. In one embodiment, the rotary to linear actuator 100 can be used advantageously in the food packaging industry In one embodiment, the rotary to linear actuator 100 can be used to move one or more tools in a heat sealing apparatus 100, for example. In one embodiment, the heat sealing apparatus 100 can include an upper tool 166 and a lower tool 168 configured to come together to heat seal a barrier film 174 onto a food tray 180, for example. One or both of the tools 166, 168 can be configured to reciprocate up and down by connecting the piston 102 on the rotary to linear actuator 100 to a shaft on the respective tool. In one embodiment of the heat sealing apparatus, the upper tool 166 can include heating elements 182 to the bottom thereof. The bottom tool 168 includes a cavity or opening to accommodate a tray 180. The tray 180 can have a flange 184 extending outward that encircles the entire upper perimeter of the tray 180. Optionally, the flange 184 can be formed from the tray 180 prior to heat sealing the barrier film 174. The barrier film 174 is provided on a feed roller 170 and is stretched across between the upper tool 166 and the lower tool 168. The take up roll 172 collects the waste barrier film after cutting the barrier film from the tray flange 184. The upper tool 166 can be provided with a cutting device that cuts out the barrier film 174 after it has been heat sealed to the tray 180.

In one embodiment, it is possible that both the upper tool 166 and the lower tool 168 are reciprocated up and down using a respective rotary to linear actuator 100. However, other apparatus with only one reciprocating tool are possible.

While illustrative embodiments have been illustrated and described, it will be appreciated that various changes can be made therein without departing from the spirit and scope of the invention.

The embodiments of the invention in which an exclusive property or privilege is claimed are defined as follows:

1. A rotary to linear actuator, comprising:
   a drive crankarm that rotates in a first axis of rotation;
   a second crankarm connected to the drive crankarm, wherein the second crankarm rotates in a second axis of rotation radially distant from the first axis of rotation;
   a first pinion gear connected to the second crankarm, wherein the first pinion gear rotates in the second axis of rotation, and the first pinion gear is intermeshed with a stationary first ring gear;
   a third crankarm connected to the second crankarm through a rod journal radially distant from the second axis of rotation, wherein the third crankarm rotates in the second axis of rotation, and the rod journal passes through a third axis of rotation;
   a second pinion gear connected to the third crankarm, wherein the second pinion gear rotates in the second axis of rotation, and the second pinion gear is intermeshed with a stationary second ring gear;
   a piston connected to the rod journal, wherein the piston travels in a reciprocating linear motion as the drive crankarm is rotated.

2. The rotary to linear actuator of claim 1, wherein the rod journal rotates with respect to one end of the piston.

3. The rotary to linear actuator of claim 1, wherein one end of the piston is positioned between the first and second pinion gears.

4. The rotary to linear actuator of claim 1, wherein one end of the piston is positioned between the second and third crankarms.

5. The rotary to linear actuator of claim 1, wherein a distance between the first to the second axis of rotation is the same as a distance between the second to the third axis of rotation.

6. The rotary to linear actuator of claim 1, wherein a number of teeth of the pinion gears is one-half a number of teeth of the ring gears.

7. The rotary to linear actuator of claim 1, wherein a pitch circle circumference of the pinion gears is one-half a pitch circle circumference of the ring gears.

8. The rotary to linear actuator of claim 1, wherein the second crankarm has a first stub axle extending proximally, wherein the first stub axle rotates in the second axis of rotation within a bore of the drive crankarm.

9. The rotary to linear actuator of claim 1, wherein the third crankarm has a second stub axle extending distally, wherein the second stub axle rotates within a bore of a third stub axle.

10. The rotary to linear actuator of claim 9, wherein the third stub axle rotates in the first axis of rotation and is supported to a housing of the rotary to linear actuator.

11. The rotary to linear actuator of claim 1, further comprising a servo motor configured to rotate the drive crankarm.

12. The rotary to linear actuator of claim 11, wherein the servo motor is configured to rotate the drive crankarm according to a sequence of steps, comprising:
   start at 0 degrees, wherein at 0 degrees the piston is fully retracted;
   rotate 180 degrees in a first direction, wherein at 180 degrees the piston is fully extended;
   pause at 180 degrees;
   rotate 180 degrees in a second direction opposite to the first direction;
   pause at 0 degrees completing one cycle;
   rotate 180 degrees in the second direction; and
   repeat pausing at 180 degrees and 0 degrees with alternating rotation between the first and second directions.

13. The rotary to linear actuator of claim 11, wherein the servo motor is configured to rotate the drive crankarm according to a sequence of steps, comprising:
   start at 0 degrees, wherein at 0 degrees the piston is fully retracted;
   rotate 180 degrees in a first direction, wherein at 180 degrees the piston is fully extended;
   pause at 180 degrees;
   rotate another 180 degrees in the first direction and pause at 0 degrees completing one cycle; and
   repeat pausing at 180 degrees and 0 degrees while rotating in the first direction.

14. The rotary to linear actuator of claim 12, wherein the servo motor is configured to perform at least twenty cycles per minute.

15. The rotary to linear actuator of claim 12, wherein the piston can apply from 0 to 100 tons of pressure.

16. An apparatus, comprising:
   the rotary to liner actuator of claim 1;
   wherein the piston is configured to reciprocate at least one tool, wherein the at least one tool can be brought together with a second tool to create a package.

17. The apparatus of claim 16, comprising heat sealing a barrier film to the package.

18. A rotary to linear actuator, comprising:
a drive crankarm that rotates in a first axis of rotation to rotate a second axis of rotation;
a first and second gearset connected to the drive crankarm through a second crankarm, wherein the second crankarm has a center of rotation at the second axis of rotation;
a piston captured between the first gearset and the second gearset, wherein the first and second gearsets rotate the second crankarm and a third crankarm, the second and third crankarms are connected to one end of the piston, wherein the piston is caused to move linearly upon rotation of the drive crankarm.

19. The rotary to linear actuator of claim 18, wherein the first gearset includes a single pinion gear and stationary ring gear, and the second gearset includes a single pinion gear and stationary ring gear, wherein the center of rotation of the first and second pinion gears is in the second axis of rotation.

20. An apparatus, comprising:
the rotary to liner actuator of claim 18;
wherein the piston is configured to reciprocate at least one tool, wherein the at least one tool can be brought together with a second tool to create a package.

\* \* \* \* \*